United States Patent
Lei (10) Patent No.: US 9,912,367 B2
(45) Date of Patent: Mar. 6, 2018

(54) ELECTRONIC DEVICE AND METHOD FOR USING THE SAME

(71) Applicant: Xiaomi Inc., Beijing (CN)

(72) Inventor: Jun Lei, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/984,287

(22) Filed: Dec. 30, 2015

(65) Prior Publication Data

US 2016/0112086 A1 Apr. 21, 2016

Related U.S. Application Data (63) Continuation-in-part of application No. PCT/CN2015/074522, filed on Mar. 18, 2015.

(30) Foreign Application Priority Data

Oct. 17, 2014 (CN) .......................... 2014 1 0553782

(51) Int. Cl.
*H04M 1/02* (2006.01)
*H04B 1/3888* (2015.01)
(Continued)

(52) U.S. Cl.
CPC ......... *H04B 1/3888* (2013.01); *G06F 1/1626* (2013.01); *G06F 1/1635* (2013.01);
(Continued)

(58) Field of Classification Search
CPC ... H04B 1/3888; G06F 1/1626; G06F 1/1635; G06F 1/1637
(Continued)

(56) References Cited

U.S. PATENT DOCUMENTS

2003/0236821 A1* 12/2003 Jiau .......................... H04L 63/10
709/203
2004/0259599 A1* 12/2004 Okawa .................. G06Q 30/02
455/567
(Continued)

FOREIGN PATENT DOCUMENTS

CN 1315752 A 10/2001
CN 201450068 U 5/2010
(Continued)

OTHER PUBLICATIONS

Office Action dated Nov. 22, 2016 for Japanese Application No. 2016-553701, 4 pages.
(Continued)

*Primary Examiner* — Cong Tran
(74) *Attorney, Agent, or Firm* — Finnegan, Henderson, Farabow, Garrett & Dunner LLP (57) ABSTRACT

The present disclosure provides electronic devices and methods for using the electronic device. The electronic device includes: a transparent case and a transparent liquid battery. The transparent case is sealed to form a holding cavity in which the transparent liquid battery, a display screen component, a mainboard component, an accessory component and a power control component are disposed. The mainboard component is connected to the display screen component made from transparent material. The mainboard component is connected to the accessory component. The mainboard component is connected to the power control component. The electronic device is made from transparent material so that the electronic device is featured by transparency, without additionally equipping the rear cover of the electronic device with a transparent protective casing.

17 Claims, 8 Drawing Sheets

(51) Int. Cl.
*G06F 1/16* (2006.01)
*H04M 1/22* (2006.01)
*H04M 1/57* (2006.01)
*H04M 1/725* (2006.01)

(52) U.S. Cl.
CPC .......... *G06F 1/1637* (2013.01); *G06F 1/1656* (2013.01); *H04M 1/0202* (2013.01); *H04M 1/0262* (2013.01); *H04M 1/0266* (2013.01); *H04M 1/0283* (2013.01); *H04M 1/22* (2013.01); *H04M 1/576* (2013.01); *H04M 1/72569* (2013.01); *H04M 2250/12* (2013.01); *H04M 2250/22* (2013.01)

(58) Field of Classification Search
USPC .... 455/575.1, 90.3, 347, 11.1, 95, 101, 572, 455/573, 127.5, 128, 566; 345/520, 204, 345/207, 690, 905
See application file for complete search history.

(56) References Cited

U.S. PATENT DOCUMENTS

| | | | |
|---|---|---|---|
| 2012/0071207 A1* | 3/2012 | Yoo | G06F 1/1626 455/566 |
| 2012/0118772 A1 | 5/2012 | Ellis-Brown | |
| 2013/0012264 A1* | 1/2013 | Mitsunaga | G01C 21/20 455/556.1 |
| 2013/0022868 A1* | 1/2013 | Yang | H01M 4/13 429/217 |
| 2013/0069868 A1* | 3/2013 | Kobori | G06F 3/04883 345/157 |
| 2013/0100379 A1 | 4/2013 | Haynes et al. | |
| 2014/0168236 A1* | 6/2014 | Keefe | G09G 3/3406 345/520 |
| 2014/0191961 A1* | 7/2014 | Mori | G06F 3/04812 345/157 |
| 2014/0287213 A1* | 9/2014 | Lee | G02F 1/133308 428/217 |
| 2014/0368168 A1* | 12/2014 | Beckman | H02J 7/0063 320/134 |
| 2015/0004451 A1* | 1/2015 | Elian | H01M 10/48 429/90 |
| 2015/0132665 A1* | 5/2015 | Ito | C07D 207/06 429/336 |

FOREIGN PATENT DOCUMENTS

| | | |
|---|---|---|
| CN | 202268393 U | 6/2012 |
| CN | 102662560 A | 9/2012 |
| CN | 203180992 U | 9/2013 |
| CN | 203180997 U | 9/2013 |
| CN | 102176728 B | 12/2013 |
| EP | 2 341 698 A1 | 7/2011 |
| EP | 2 518 810 A1 | 10/2012 |
| JP | 2002-117907 A | 4/2002 |
| JP | 2005-302492 A | 10/2005 |
| JP | 2006-113166 A | 4/2006 |
| JP | 2009-009351 A | 1/2009 |
| JP | 2010-256066 A | 11/2010 |
| KR | 10-2011-0077729 A | 7/2011 |
| KR | 10-2012-0136379 A | 12/2012 |
| KR | 10-1418678 B1 | 8/2014 |
| KR | 10-2014-0115236 A | 9/2014 |
| RU | 2 395 925 C2 | 7/2010 |
| WO | WO 2006/038403 A1 | 4/2006 |

OTHER PUBLICATIONS

English Abstract of "A Transparent Concept Phone Which Can Change with Weather," China New Telecommunications, No. 24, Dec. 31, 2011, 2 pages.
Blog, "Transparent Smartphone to be Released Within the Year!," <http://m.blog.daum.net/_blog/m/articleView.do?blogid=02WPM&articleno=13382681>, Feb. 11, 2013, 6 pages.
Bourzac, Katherine, "A Battery You Can See Through," MIT Technology Review, Jul. 25, 2011, 2 pages.
International Search Report dated Jun. 29, 2015 for International Application No. PCT/CN2015/074522, 7 pages.
Kim, Eugene, "Cool Concept: Samsung Aqua (3 pics)," My Modern Met, <http://www.mymodernmet.com/profiles/blogs/cool-concept-samsung-aqua-3>, Sep. 8, 2010, 4 pages.
Office Action dated Mar. 18, 2016 for Korean Application No. 10-2015-7012812, 6 pages.
Office Action dated Oct. 13, 2016 for Russian Application No. 2015126469-07, 19 pages.
Partial European Search Report dated Jan. 7, 2016 for European Application No. 15185007.0, 10 pages.

* cited by examiner

ELECTRONIC DEVICE AND METHOD FOR USING THE SAME

PRIORITY STATEMENT

This application is a continuation-in-part application of International Application PCT/CN2015/074522, filed on Mar. 18, 2015, which is based on and claims priority to Chinese Patent Application No. 201410553782.1, filed on Oct. 17, 2014, the entire disclosures of which are incorporated herein by reference.

TECHNICAL FIELD

The present disclosure generally relates to the field of electronic device manufacturing, and more particularly, to electronic devices and methods for using the electronic devices.

BACKGROUND

Nowadays, appearance of electronic device, such as mobile phones, diversifies greatly with the development of electronic device manufacturing technologies. For example, manufactures now are able to provide covers with specific colors for electronic devices, or install protective casings with specific colors to electronic devices.

In order to provide a transparent look to an electronic device, a user may additionally add a transparent protective casing over the rear cover of the electronic device. The cover of the transparent protective casing may change corresponds with environment colors of the electronic device.

SUMMARY

The present disclosure provides an electronic device and a method for operating the electronic device. According to an aspect of the present disclosure, an electronic device may comprise a transparent case including a holding cavity accommodating a plurality of hardware components including: a mainboard component; a transparent display screen component electronically connected to the mainboard component; an accessory component electronically connected to the mainboard component; and a transparent liquid battery.

According to another aspect of the present disclosure, a method for operating the electronic device may comprise controlling, by the mainboard component, at least one lamp of the electronic device to emit light with a color to generate a florescent glowing effect over the electronic device. The light may be a background color displayed by the transparent display screen component; according to a color instruction from a user; according to an identification of a target electronic device in communication with the electronic device; and/or an environment color of the electronic device.

According to yet another aspect of the present disclosure, a method for operating the electronic device, may comprise obtaining, by the mainboard component, a first position on the transparent display screen component corresponding to the anode; obtaining, by the mainboard component, a second position on the transparent display screen component corresponding to the cathode; and when the electronic device is in a charging state, controlling, by the mainboard component, the display screen component to display a predetermined animation of the charging between the first position and the second position. The predetermined animation may show that an electric current is flowing between the first position and the second position, that bubbles are generated from the first position and the second position, and that electric currents are respectively flowing from the first position and the second position to a battery icon displayed on the transparent display screen component.

It will be appreciated that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
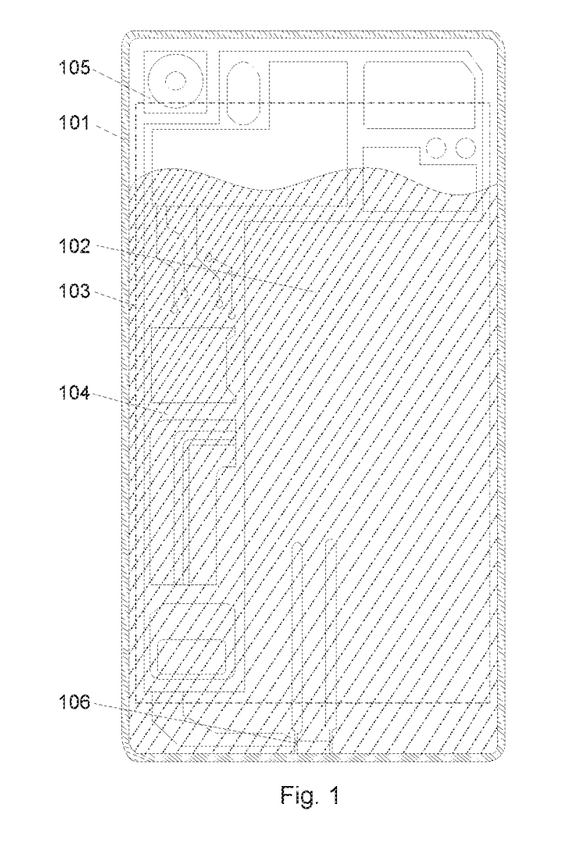
FIG. 1 is a block diagram of an electronic device according to an exemplary embodiment.

FIG. 1 is a block diagram of an electronic device according to an exemplary embodiment, as shown in FIG. 1, the electronic device may include but is not limited to: a transparent case 101 made of a transparent material and a power supply. The power supply may include a transparent liquid battery 102 and a power control component 106. The transparent case 101 is sealed to form a holding cavity in which the transparent liquid battery 102, a display screen component 103, a mainboard component 104, an accessory component 105 and the power control component 106 are disposed. The power control component 106 may be an electronic component to manage the transparent liquid battery 102. For example, the power control component 106 may include a charging chip and charging electrodes, etc. The mainboard component 104 may be electronically connected to the display screen component 103, wherein the display screen may be made from transparent material; the mainboard component 104 may also be electronically connected to the accessory component 105 and the power control component 106.

In conclusion, as to the electronic device provided in embodiments of the present disclosure, the transparent case is sealed to form a holding cavity in which the transparent liquid battery, the display screen component, the mainboard component, the accessory component and the power control component are disposed, wherein the mainboard component is electronically connected to the display screen component, the mainboard component is electronically connected to the accessory component, and the mainboard component is electronically connected to the power control component. Accordingly, the electronic device is made from transparent material so that electronic device is featured by transparency, without additionally equipping the rear cover of electronic device with a transparent protective casing, thus solving the problem that additional configuration of a transparent protective casing leads to poorer heat dissipation performance of electronic device, and achieving the effect of improving the whole transparency of electronic device.

Figure 2A:
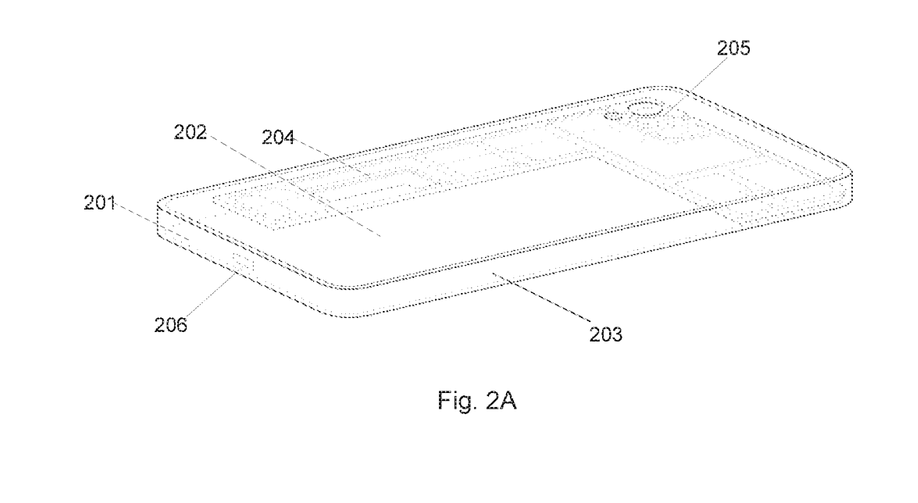
FIG. 2A is a block diagram of an electronic device according to another exemplary embodiment.

FIG. 2A is a block diagram of an electronic device according to another exemplary embodiment, as shown in FIG. 2A, the electronic device includes but is not limited to: a transparent case 201 and a plurality of hardware components. The plurality of hardware components may include a display screen component 203, a mainboard component 204, an accessory component 205 and a power supply including a transparent liquid battery 202 and a power control component 206. The transparent case 201 is sealed to form a holding cavity in which the plurality of hardware components (e.g., the transparent liquid battery 202, the display screen component 203, the mainboard component 204, the accessory component 205 and the power control component 206) is disposed. The mainboard component 204 is electronically connected to the display screen component 203, and the display screen is made from transparent material. Additionally, the mainboard component 204 is also electronically connected to the accessory component 205 and the power control component 206.

The display screen component 203 may be controlled for display by the mainboard component 204 via its connection with the display screen component 203, and the display screen may be made from transparent material so as to ensure transparency of electronic device. The accessory component 205 may be controlled by the mainboard component 204 via its connection with the accessory component 205. The accessory component 205 may include a web camera, a flash lamp, and a distance sensor, etc. The power control component 206 may be controlled by the mainboard component 204 via its connection with the power control component 206 to manage the transparent liquid battery 202, and the power control component 206 may include a charging chip and charging electrodes, etc.

In the present embodiment, the transparent case 201 may be made from transparent material into a one-piece cover so as to ensure that the cover is sealed and the operating environment of components in the holding cavity is clean; or, the transparent case 201 may be made from transparent material into a transparent front cover 2011 and a transparent rear cover 2012, and both the transparent front cover 2011 and the transparent rear cover 2012 are assembled to form the transparent case 201.

For example, the transparent case 201 includes a transparent front cover 2011 and a transparent rear cover 2012, both the transparent front cover 2011 and the transparent rear cover 2012 are sealed to form the holding cavity; and the transparent front cover 2011 is connected to the display screen component 203.

Wherein, when being connected to each other, the transparent rear cover 2012 may be connected to the transparent front cover 2011 by a plastic fastener; or, in order to improve the leakproofness of the transparent case 201, the transparent rear cover 2012 may be embedded into the transparent front cover 2011. In this case, the transparent rear cover 2012 is slightly smaller than the transparent front cover 2011 in area. Thus, the transparent rear cover 2012 may be perfectly integrated with the transparent front cover 2011 when they are connected to each other.

Figure 2B:
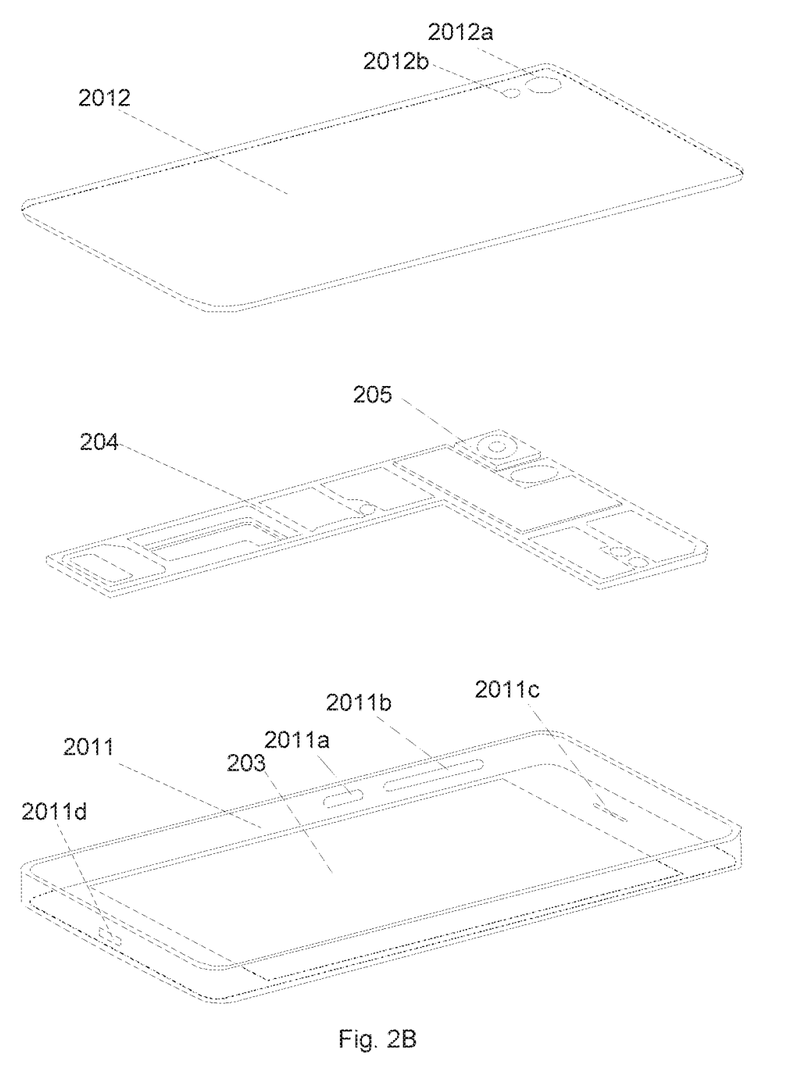
FIG. 2B is a connection diagram of an electronic device according to an exemplary embodiment.

FIG. 2B is a connection diagram of an electronic device according to an exemplary embodiment. In FIG. 2B both the transparent rear cover 2012 and the transparent front cover 2011 are round-cornered rectangular, and the transparent rear cover 2012 is slightly smaller than the transparent front cover 2011. After being connected to each other, the transparent rear cover 2012 is embedded into the transparent front cover 2011 so as to seal the joint between the transparent rear cover 2012 and the transparent front cover 2011.

It should be explained that the transparent rear cover 2012 and the transparent front cover 2011 may also be rectangular-shaped. The present embodiment does not limit shapes of the transparent rear cover 2012 and the transparent front cover 2011.

In the present embodiment, at least a portion of the liquid battery is substantially transparent. For example, the transparent liquid battery 202 may include transparent electrolyte, an anode and a cathode; the transparent electrolyte may be filled in a target space of the holding cavity, wherein the target space may be a first space being the remaining space of the holding cavity excluding the display screen component 203, the mainboard component 204, the accessory component 205, the power control component 206, the anode and the cathode. Alternatively, the holding cavity may include a transparent container (or the plurality of hardware component may further include the transparent container) for holding the transparent electrolyte, the anode, and the cathode. Accordingly, target space that the transparent electrolyte is filled in may be a second space, wherein the second space is the space of the transparent container excluding the anode and the cathode.

For example, when the transparent liquid battery 202 is transparent electrolyte, both the anode and the cathode are disposed in the holding cavity, and the transparent electrolyte is filled in the first space, i.e., the space within the holding cavity excluding the display screen component 203, the mainboard component 204, the accessory component 205, the power control component 206, the anode and the cathode. The transparent electrolyte may freely flow within the holding cavity, which is formed by sealing up a seam between the transparent rear cover 2012 and the transparent front cover 2011, thus improving the space utilization of the holding cavity. Or, the transparent electrolyte, the anode and the cathode are disposed in a transparent container, which is disposed in the holding cavity and is respectively connected to the display screen component 203, the mainboard component 204, the accessory component 205 and the power control component 206. The transparent container may be equal to the transparent rear cover 2012 in length and width so that the transparent container may be embedded between the transparent front cover 2011 and the transparent rear cover 2012. In this way, the transparent electrolyte, the anode and the cathode are disposed in a transparent container so that it is convenient to execute an operation (inspection, replacement and the like) on the transparent liquid battery.

Wherein, the power control component 206 is configured to control the process for charging the transparent electrolyte by the anode and the cathode, or, to control the discharge process of the transparent electrolyte. For example, when the transparent electrolyte is filled in the first space of the holding cavity, the transparent electrolyte may contact the display screen component 203, the mainboard component 204 and the accessory component 205, respectively. Thus when the transparent electrolyte is at a discharge process, the transparent electrolyte may directly provide power to the display screen component 203, the mainboard component 204, and the accessory component 205.

In order to prevent potential safety hazards caused by trace gases generated by the transparent electrolyte during battery charge and/or discharge, the transparent electrolyte has a filling ratio of less than 1 in the first space. In other words, when the transparent electrolyte is filled into the holding cavity, the holding cavity is provided with a reserved space for storing the gases generated by the transparent electrolyte during battery charge and/or discharge. Correspondingly, when the transparent electrolyte, the anode and the cathode are disposed in the second space of the transparent container, the transparent electrolyte also has a filling ratio of less than 1 in the second space.

The transparent electrolyte may be lithium battery electrolyte or other kinds of electrolyte, and may not generate gas in the charge or discharge process, or may generate trace gas, so as to prevent from generating a lot of gas in confined space thus leading to potential safety hazard. The present embodiment does not limit the category of electrolyte.

For example, the display screen component 203, the mainboard component 204 and the accessory component 205 may be sealed with a transparent material; and if the transparent electrolyte is filled in the first space, the transparent material is acid-resistant and alkaline-resistant material, or the transparent material is plated with acid-resistant and alkaline-resistant material.

When the display screen component 203, the mainboard component 204 and the accessory component 205 are made from transparent material, the display screen component 203, the mainboard component 204 and the accessory component 205 may be directly disposed in the holding cavity. When the display screen component 203, the mainboard component 204 and the accessory component 205 are not made from transparent material, the display screen component 203, the mainboard component 204 and the accessory component 205 may be externally sealed with a transparent material to generate a jelly-like appearance over the so as to increase transparency of electronic device.

In actual use, when the transparent liquid battery 202 is disposed in a transparent container, the display screen component 203, the mainboard component 204 and the accessory component 205 externally sealed with transparent material may be directly disposed in the holding cavity. The electrolyte is generally acid or alkali liquid, thus, the transparent container may be made from acid-resistant and alkaline-resistant material, or the transparent container may be plated with acid-resistant and alkaline-resistant material on the surface in contact with electrolyte, so as to prevent the transparent electrolyte from corroding the transparent container.

When the transparent liquid battery 202 is directly disposed in the holding cavity, the transparent electrolyte may be filled into the holding cavity, which is a confined space formed by connection between the transparent rear cover 2012 and the transparent front cover 2011. Because the transparent electrolyte is generally acid or alkali liquid, when the transparent rear cover 2012 is made from a poor acid-resistant and alkaline-resistant material, the transparent rear cover 2012 may be plated with an acid-resistant and alkaline-resistant material on their inner surface in contact with transparent electrolyte, so as to prevent the transparent electrolyte from corroding the transparent rear cover 2012. Wherein, the poor acid-resistant and alkaline-resistant material may be transparent organic glass, etc.

Similarly, the mainboard component 204 is disposed in electronic device and is in direct contact with transparent electrolyte. Therefore, the mainboard component 204 may be made from acid-resistant and alkaline-resistant material, or, the mainboard component 204 may be sealed up by acid-resistant and alkaline-resistant material, or, the mainboard component 204 may be sealed up by transparent material which is then plated with acid-resistant and alkaline-resistant material, so as to prevent the transparent electrolyte in electronic device from corroding the transparent material on the mainboard component 204. Namely, the transparent material for sealing up the mainboard component 204 is acid-resistant and alkaline-resistant material, or, the transparent material for sealing up the mainboard component 204 is plated with acid-resistant and alkaline-resistant material. Similarly, the transparent material for sealing up the display screen component 203 is add-resistant and alkaline-resistant material, or, the transparent material for sealing up the display screen component 203 is plated with acid-resistant and alkaline-resistant material. The transparent material for sealing up the accessory component 205 is acid-resistant and alkaline-resistant material, or, the transparent material for sealing up the accessory component 205 is plated with acid-resistant and alkaline-resistant material. For example, the mainboard component 204 and the accessory component 205 may be sealed together by transparent material.

For example, when the transparent front cover 2011 is connected to the display screen component 203, the display screen component 203 may be completely fused and/or glued to the transparent front cover 2011 so that the transparent front cover resembles just like a protection layer of the display screen of the display screen component 203. Doing so helps fixing the display screen component 203, as well as reducing the contact area between the display screen component 203 and the transparent electrolyte when the transparent electrolyte is filled in the first space, thereby reducing the possibility of corrosion of the display screen component 203 by the transparent electrolyte. When the display screen component 203 is completely fused and/or glued to the transparent front cover 2011, only one side of the display screen component 203 in contact with the transparent electrolyte is subject to a treatment of acid and alkali resistance.

When the transparent electrolyte is filled in the first space and the contact area between the transparent front cover 2011 and the display screen component 203, the mainboard component 204 and the accessory component 205 is relative small and the transparent front cover 2011 is still in contact with the transparent electrolyte, in this case, the transparent front cover 2011 may be made from acid-resistant and alkaline-resistant material, e.g., glass material; or, the transparent front cover 2011 may be made from poor acid-resistant and alkaline-resistant material, such as transparent organic glass, in this case, a layer of acid-resistant and alkaline-resistant material is plated on the contact surface between the transparent front cover 2011 and the transparent electrolyte, so as to prevent the transparent electrolyte from corroding the transparent front cover 2011. Namely, if the transparent electrolyte is in contact with the transparent front cover 2011 and the transparent front cover 2011 is made from glass material, acid-resistant and alkaline-resistant material is plated on the contact surface between glass material and the transparent electrolyte.

When the transparent rear cover 2012 is connected to the transparent front cover 2011, the connection joint and/or seam between the transparent rear cover 2012 and the transparent front cover 2011 is sealed up by acid-resistant and alkaline-resistant material so as to prevent the transparent electrolyte from leaking out.

For example, the transparent front cover 2011 may be made from glass material or transparent organic glass material with predetermined strength grade, to which the present embodiment makes no restriction. The predetermined strength grade is generally high. For example, if strength grades of glass material are classified into ten grades, wherein the 8th grade, the 9th grade and the 10th grade are high strength grades, the predetermined strength grade may be any one of the 8th grade, the 9th grade and the 10th grade. It should be explained that material for manufacturing the transparent rear cover 2012 is not limited in the present embodiment.

The transparent rear cover 2012 may be designed and/or manufactured to include positions for installation of a part of built-in accessories in the electronic device. For example, the rear cover of the electronic device may include positions for installation of a web camera and a flash lamp. Therefore, the transparent rear cover 2012 may be designed and/or manufactured to have a hole 2012a and a hole 2012b. Wherein, the hole 2012a is used to install the web camera of a camera component in the accessory component 205, and the hole 2012b is used to install the flash lamp of the camera component in the accessory component 205. Of course, the transparent rear cover 2012 may also be preformed with positions for installation of other built-in accessories. The quantity and shape of holes in the transparent rear cover 2012 are not limited in the present embodiment.

The installation positions on the transparent rear cover 2012 may be sealed up by acid-resistant and alkaline-resistant material so as to prevent the transparent electrolyte from leaking out.

Because the transparent rear cover 2012 is transparent, the transparent rear cover 2012 may also be designed to be free from holes, such as the hole 2012a and the hole 2012b. The camera component may simply be installed in a camera position without hole, and the camera component may conduct normal picture shooting by through the transparent rear cover 2012. Similarly, the flash lamp may simply be installed in a flash lamp position without hole, and the flash lamp in the camera component may be able to conduct normal lighting through the transparent rear cover 2012.

The transparent front cover 2011 may be designed and/or manufactured to have positions for installation of a part of function keys such as a power key 2011a, a volume key 2011b, an earpiece 2011c and a USB (Universal Serial Bus) interface 2011d, as shown in FIG. 2B.

The mainboard component 204 may be made of transparent materials. For example, the mainboard component 204 may include a circuit board with transparent electronic resistors, capacitors, inductors etc. connected by conductive polymer materials. Alternatively, the mainboard component may be made of opaque materials. Alternatively, the mainboard component 204 may be made of at least two layers of transparent materials sandwiching a layer of liquid crystals. The mainboard component 204 may include a control circuit to send an electronic control signal, which may be used to switch the crystal orientation of the liquid crystal, so that the mainboard component 204 (or the liquid crystal layer) may switch between a transparent state, a semi-transparent state, and an opaque state. Further, the crystal may be configured to create different colors. Consequently, the mainboard component 204 may turn to different colors, depending on the electronic control signal.

The mainboard component 204 may include a circuit board. The circuit board may be a circuit board with a predetermined shape. For example, the predetermined shape may be a shape with aesthetic value and/or aesthetic element designed by manufacturers to meet different users aesthetic tastes and demands. The aesthetic element may be an element of aesthetic value as a circuit board. Users may also customize a circuit board with a desired shape such as popular cartoon character DORAEMON™, HELLO KITTY™, or GARFIELD™, etc. Accordingly, the circuit printed on the circuit board may be designed to fit into the aesthetic shape and/or element of the circuit board. For example, the mainboard component of the electronic device may include a circuit board and an electronic circuit thereon. The electronic circuit may include a plurality of electronic elements, such as electronic chips, capacitors, resistors, and electronic connections, etc. When the circuit board has a shape of HELLO KITTY™, the electronic circuit may be designed to have a contour matching the shape of HELLO KITTY™.

The accessory component 205 may include: at least one lamp, each lamp may emit light with at least one color, and each lamp is respectively connected to the mainboard component 204 and the transparent liquid battery 202.

Each lamp may emit the light with at least one color. For example, a lamp emits blue light, a lamp emits green light, a lamp emits yellow light, a lamp emits red light and so on. Further, each lamp may be positioned in the electronic device so that when the lamp emits the light, because the electronic device is transparent, the light may be refracted, transmitted, reflected, and scattered by the transparent components and covers of the electronic device. Consequently, the light may generate a florescent glowing effect over the transparent materials of the electronic device, thereby generating the glowing effect over the body of the electronic device.

In the present embodiment, each lamp is respectively connected to the mainboard component 204 and the transparent liquid battery 202. The mainboard component 204 is configured to control on-off of a lamp, and the transparent liquid battery 202 is configured to provide power for a lamp.

The electronic device may also include a color sensor, which is respectively connected to the mainboard component 204 and the transparent liquid battery 202.

In the present embodiment, the color sensor is respectively connected to the mainboard component 204 and the transparent liquid battery 202. The mainboard component 204 is configured to control on-off of the color sensor, and the transparent liquid battery 202 is configured to provide power for the color sensor.

It should be explained that the whole transparent electronic device is subject to a waterproof design, capable of preventing transparent electrolyte from leaking out and also preventing external liquid from flowing into the transparent electronic device.

In conclusion, as to the electronic device provided in embodiments of the present disclosure, a transparent electronic device is formed by connecting the transparent front cover provided with a display screen component, built-in accessories sealed up by transparent material, the transparent liquid battery and the transparent rear cover. Accordingly, the electronic device is made from transparent material so that the electronic device is featured by transparency, without additionally equipping the rear cover of the electronic device with a transparent protective casing, thus solving the problem that additional configuration of a transparent protective casing leads to poorer heat dissipation performance of electronic device, and achieving the effect of improving transparency of the whole electronic device.

In the electronic device provided in embodiments of the present disclosure, the electronic device is supplied with power by transparent electrolyte, which may make full use of space, thus solving the problem of lower space utilization of electronic device, which is provided with power by a solid-state battery, and reaching the effect of improving the space utilization of electronic device.

In the electronic device provided in embodiments of the present disclosure, the transparent front cover is made from glass material or organic glass material with predetermined strength grade, thus solving the problem that the display screen and front cover of the electronic device are easily broken or damaged under ambient pressure, and reaching the effect of protecting built-in devices in the electronic device and extending the service life of the electronic device.

Figure 3A:
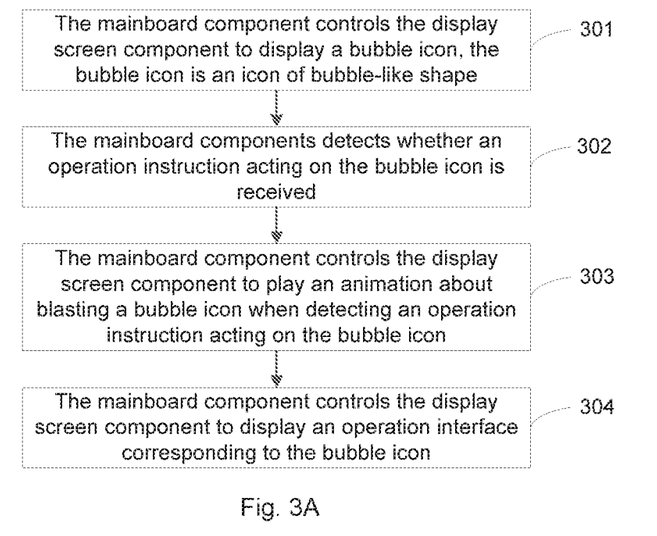
FIG. 3A is a flow chart of a method for using an electronic device according to an exemplary embodiment.

FIG. 3A is a flow chart of a method for using an electronic device according to an exemplary embodiment. The method may be implemented in the electronic device as shown in FIG. 2A. The method for using the electronic device may include the following steps.

In Step 301, the mainboard component controls the display screen component to display a bubble icon, wherein the bubble icon is an icon of bubble-like shape.

Figure 3B:
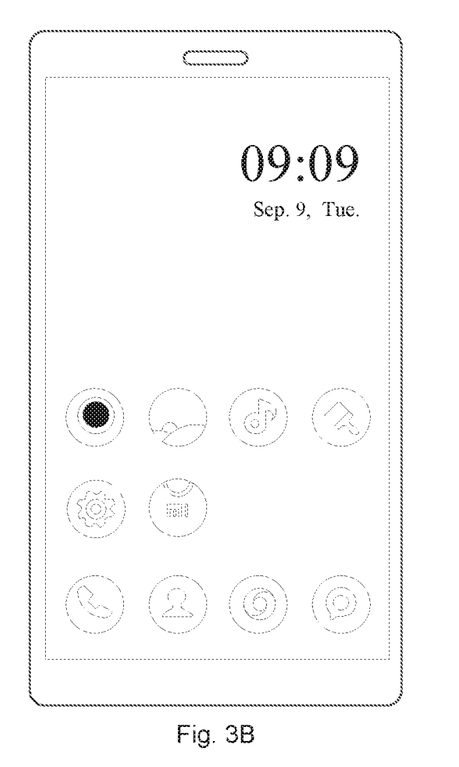
FIG. 3B is a schematic diagram of an electronic device displaying a bubble icon according to an exemplary embodiment.

The mainboard component of the electronic device may control the display screen component to display a bubble-shaped icon on a display screen. FIG. 3B is a schematic diagram of an electronic device displaying a bubble-shaped icon according to an exemplary embodiment. The electronic device may control the display screen component to display bubble-shaped icons (such as camera, photo album, music and theme, etc.) on a display screen.

In Step 302, the mainboard components detects whether an operation instruction acting on the bubble icon is received.

In the present embodiment, the display screen is touch-enabled. The electronic device may receive an operation instruction when the user clicks the bubble icon on the display screen.

In Step 303, the mainboard component controls the display screen component to play an animation about blasting a bubble icon when detecting an operation instruction acting on the bubble icon.

Wherein, the animation about blasting a bubble icon is pre-stored in the electronic device. After receiving the operation instruction, the electronic device may control a player to play the animation via the mainboard component, and control the display screen component to display the played animation.

In Step 304, the mainboard component controls the display screen component to display an operation interface corresponding to the bubble icon.

Figure 3C:
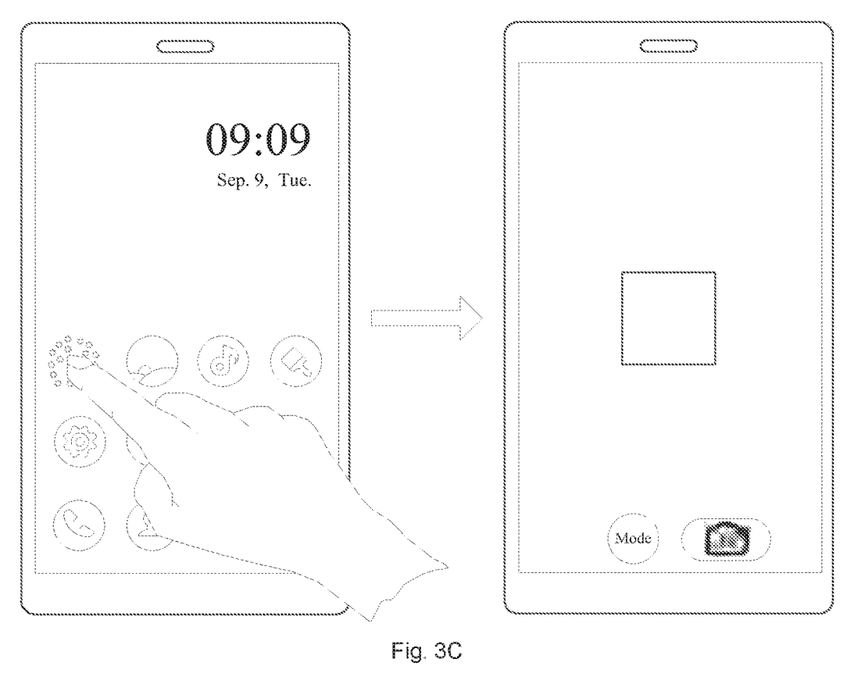
FIG. 3C is a schematic diagram of an electronic device displaying an interface corresponding to a bubble icon according to an exemplary embodiment.

FIG. 3C is a schematic diagram about an electronic device displaying an interface corresponding to a bubble icon according to an exemplary embodiment. When a user clicks a bubble-shaped icon of a camera, the electronic device controls the display screen component to display the animation of blasting the bubble-shaped icon of the camera on the display screen via the mainboard component and enters into the camera interface.

In conclusion, as to the method for using an electronic device provided in embodiments of the present disclosure, the display screen component is controlled to display a bubble icon by means of the mainboard component, and display the animation about blasting the bubble icon after an operation instruction acting on the bubble icon is received. An icon is set to be shaped like a bubble according to characteristics of the transparent electrolyte, thus solving the problem that ordinary icons are boring and dull, and reaching the effect of improving the display effect of the whole electronic device.

Figure 4:
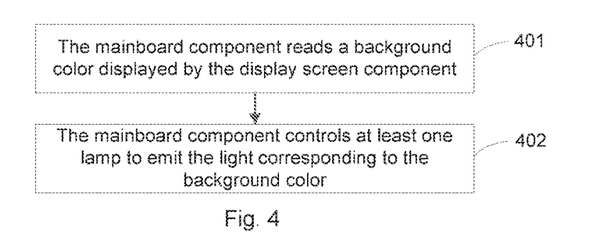
FIG. 4 is a flow chart of a method for using an electronic device according to an exemplary embodiment.

FIG. 4 is a flow chart of a method for using an electronic device according to an exemplary embodiment. The method may be implemented in the electronic device as shown in FIG. 2A, which is provided with at least one lamp. The method for using the electronic device may include the following steps.

In Step 401, the mainboard component reads a background color displayed by the display screen component.

The mainboard component may read frames displayed in the display screen component and identify the background colors of the frames. When there are more colors in the frames, the mainboard component may obtain each color in the frames until at least two background colors are acquired. Alternatively, the mainboard component may calculate and/or determine a ratio between areas on the display screen that a color takes and an entire area of the frames for each color, and determine that the color that has the largest ratio is the background color of the frames. Alternatively, the mainboard component may also detect and/or read a background color from the environment of the electronic device using the method set forth above.

In Step 402, the mainboard component controls at least one lamp to emit the light corresponding to the background color.

When the mainboard component obtains one background color, one lamp is controlled to emit the light corresponding to the background color. Because the electronic device is transparent, the light emission may generate a florescent glowing effect over the body (e.g., the front cover and rear cover) of the electronic device. When the mainboard component obtains at least two background colors, the mainboard component may control at least two lamps to respectively emit the light corresponding to each background color. The mainboard component may simultaneously control at least two lamps to emit the light, or control the at least two lamps to emit the light in turn in a predetermined sequence. For example, in a descending order according to display ratio of background colors, or, in random order, etc.

For example, when the mainboard component of the electronic device reads and/or detects that the background color displayed in the display screen component is green, the mainboard component of the electronic device controls lamps in the accessory component to activate at least one lamp to emit lights of a same color as the background color (i.e., green light) so that the whole electronic device resembles green.

In conclusion, as to the method for using an electronic device provided in embodiments of the present disclosure, background color displayed by the display screen component is read by means of the mainboard component, and at least one lamp is controlled to emit the light corresponding to the background color. Accordingly, the electronic device may change its own color according to the background color displayed in the display screen, thus solving the problem that electronic device is monotonous in color and is unable to change colors, and reaching the effect of enriching colors of electronic device.

Figure 5:
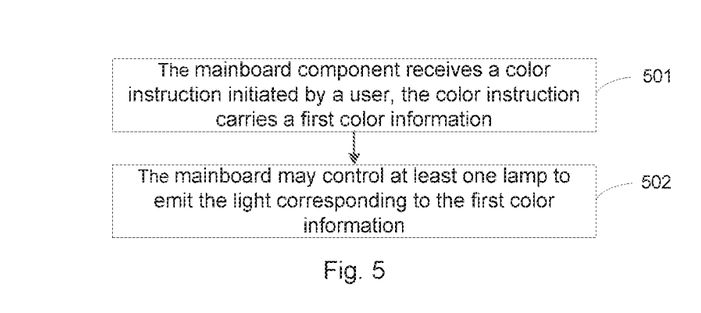
FIG. 5 is a flow chart of a method for using an electronic device according to an exemplary embodiment.

FIG. 5 is a flow chart of a method for using an electronic device according to an exemplary embodiment. The method may be implemented in the electronic device as shown in FIG. 2A, which is provided with at least one lamp. The method may include the following steps.

In Step 501, the mainboard component receives a color instruction initiated by a user, wherein the color instruction carries a first color information.

The color instruction may include the first color information. The first color information may include and/or define a color of the electronic device. For example, if a user wants to set the color of the electronic device as green, the first color information carried in the color instruction initiated by the user is green.

In the present embodiment, a user may send and/or initiate the color instruction through a setup interface. For example, the electronic device may display a plurality of color available for the user to select on the setup interface, the user may select one from the plurality of colors to generate a color instruction. Alternatively, the color selection may be a designated operation and the electronic device generates a color instruction after detection that the user conducted the designated operation. For example, the color selection may be a double click operation, and the electronic device may generate a color instruction after receiving the double click operation, etc.

In Step 502, the mainboard may control at least one lamp to emit the light corresponding to the first color information.

After receiving a color instruction by means of the mainboard component, the electronic device reads the first color information and controls at least one lamp to emit the light corresponding to the first color information by means of the mainboard component. Because the electronic device is transparent, the light emission may generate a florescent glowing effect over the body (e.g., the front cover and rear cover) of the electronic device.

For example, when a user wants to set the color of the electronic device as green, the user may select green from instructions displayed in the setup interface to generate a color instruction carrying first color information (green). After the mainboard component receives the color instruction, electronic device controls lamps in the accessory component by the mainboard component to activate at least one lamp to emit the light with a same color as the first color information (i.e., green light) so that the whole electronic device is set as green.

In conclusion, as to the method for using an electronic device provided in embodiments of the present disclosure, a color instruction initiated by a user is received by means of the mainboard component, and at least one lamp is controlled to emit the light corresponding to the first color information in the color instruction. Accordingly, a user may change the color of the electronic device according to needs, thus solving the problem that electronic device is monotonous in color and it is difficult to change colors, and reaching the effect of enriching colors of the electronic device and improving user experience.

Figure 6:
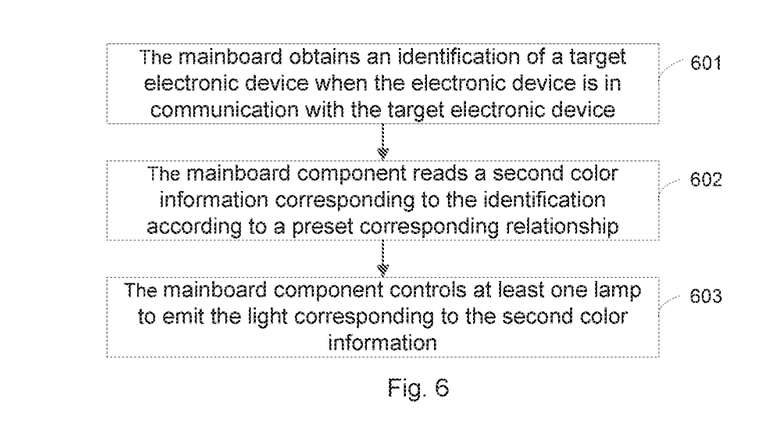
FIG. 6 is a flow chart of a method for using an electronic device according to an exemplary embodiment.

FIG. 6 is a flow chart of a method for using an electronic device according to an exemplary embodiment. The method may be implemented in the electronic device as shown in FIG. 2A, which may include at least one lamp. The method may include the following steps.

In Step 601, the mainboard obtains an identification of a target electronic device when the electronic device is in communication with the target electronic device.

The communication with the target electronic device may be either initiated by the electronic device or initiated by the target electronic device, the present embodiment does not limit on a communication initiator. Moreover, the communication may be a communication either before or after a call is connected, to which the present embodiment makes no restriction.

The identification may be used to identify an identity of the target electronic device. For example, the identification may include at least one of a telephone number, a name, such as the name of a user of the target electronic device, and a group, such as a particular group of friends in a contact list of the electronic device.

In Step 602, the mainboard component reads a second color information corresponding to the identification according to a preset corresponding relationship.

The preset relationship is a one-to-one correspondence between different identification and different second color information, which may be pre-stored in the electronic device. For example, if a relative group is corresponding to red in the corresponding relationship, the second color information read from the corresponding relationship is red when the identification read by means of the mainboard component indicates that the another electronic device belong to the relative group.

In Step 603, the mainboard component controls at least one lamp to emit the light corresponding to the second color information.

After receiving the second color information by means of the mainboard component, the electronic device controls at least one lamp to emit the light corresponding to the second color information.

For example, a user of the electronic device may classifies his/her contacts saved in the electronic device in different groups, and for each group he/she may set a corresponding color according to a preset relationship as defined in by the group. For example, the user may classify his/her contacts into a classmate group, a colleagues group, a relative group, a stranger group and other groups, and associate the classmate group to green, the colleague group to yellow, the relative group to red, and the stranger group to gray, and so on. When receiving an incoming call, the electronic device acquires the identification of the caller by the mainboard component and finds that the caller is a relative of the user. At that moment, the electronic device reads that the color corresponding to the relative group is red by the mainboard component, and then the electronic device controls lamps in the accessory component to emit red light so as to prompt the user that the caller is a relative.

In conclusion, as to the method for using an electronic device provided in embodiments of the present disclosure, identification of other electronic devices are acquired by means of the mainboard component during communicating with other electronic devices, then the second color information corresponding to the identification is read according the preset corresponding relationship by means of the mainboard component, and at least one lamp is controlled to emit the light corresponding to the second color information by means of the mainboard component. Accordingly, the user may be prompted about the identification of a caller by changing the color of the electronic device, thus solving the problem that it is unable to intuitively display the identification about a caller in case of receiving an incoming call, and reaching the effect of facilitating a user in identifying callers.

Figure 7:
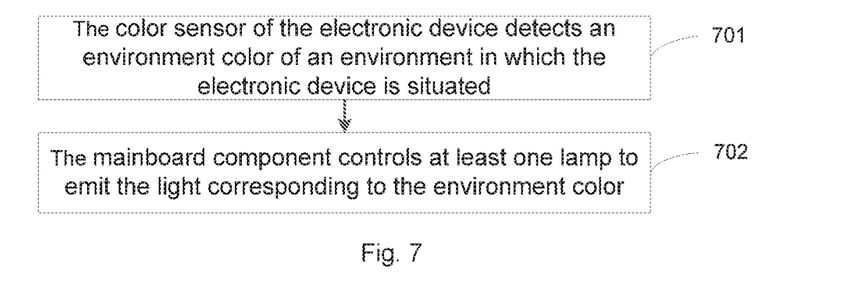
FIG. 7 is a flow chart of a method for using an electronic device according to an exemplary embodiment.

FIG. 7 is a flow chart of a method for using an electronic device according to an exemplary embodiment. The method may be implemented in the electronic device as shown in FIG. 2A, which is provided with a color sensor and at least one lamp. The method may include the following steps.

In Step 701, the color sensor of the electronic device detects an environment color of an environment in which the electronic device is situated.

The color sensor is configured to detect the environment color of an environment in which the electronic device is situated. For example, when the electronic device is in a white environment, the color sensor detects that the color of the environment is white and sends the detected color information to the mainboard component of the electronic device.

In Step 702, the mainboard component controls at least one lamp to emit the light corresponding to the environment color.

The mainboard component may receive the detected environment color control at least one lamp to emit the light corresponding to the environment color according to the environment color.

For example, when the electronic device is placed on a white desk, the mainboard component may detect that the environment color is white through the color sensor, and then the mainboard component of electronic device may control lamps in the accessory component to emit white light.

In conclusion, as to the method for using an electronic device provided in embodiments of the present disclosure, the environment color of the environment in which the electronic device is situated is acquired by means of a color sensor, and at least one lamp is controlled to emit the light corresponding to the environment color. Accordingly, the color of the electronic device may be changed according to the environment color, thus solving the problem that electronic device is monotonous in color, and reaching the effect of enriching colors of electronic device and improving the transparency of the electronic device.

Figure 8A:
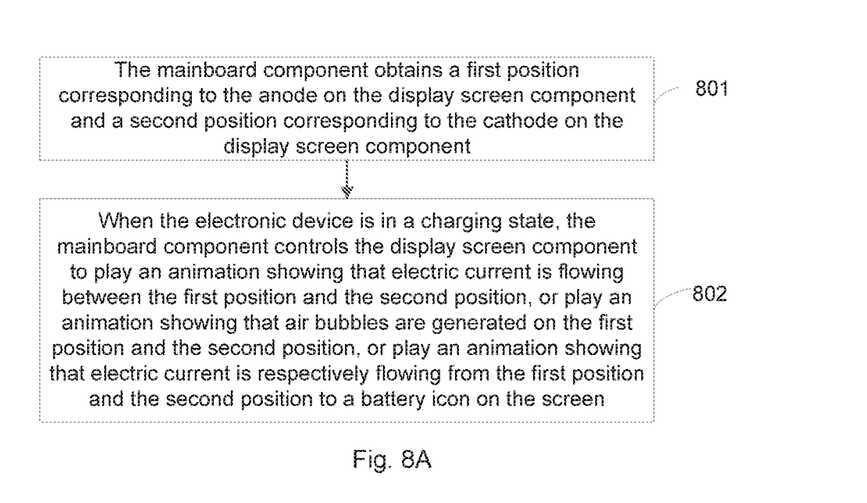
FIG. 8A is a flow chart of a method for using an electronic device according to an exemplary embodiment.

FIG. 8A is a flow chart of a method for using an electronic device according to an exemplary embodiment. The method may be implemented in the electronic device as shown in FIG. 2A, which is provided with an anode and a cathode. The method may include the following steps.

In Step 801, the mainboard component obtains a first position on the transparent display screen component corresponding to the anode and a second position on the transparent display screen component corresponding to the cathode.

In an example embodiment, the area of the transparent display screen component covers the entire front cover of the electronic device. Therefore the anode and cathode are behind the transparent display screen component. As the display screen component is made from transparent material, the anode and cathode is visible when a user looks through the transparent display screen component. The first position on the display screen component corresponding to the anode is right above the position that that the anode is installed and the second position on the display screen component corresponding to the cathode is right above the position that the cathode is installed. Wherein, the installation position may be saved in the electronic device in advance and read by the mainboard component.

In Step 802, when the electronic device is in a charging state, the electronic device controls, by the mainboard component, the display screen component to play an animation showing that electric current is flowing between the first position and the second position. Thus when a user views the transparent display screen component, the user sees both the anode and cathode behind the transparent display screen component and the animated current flowing therebetween. The electronic device therefore generates an effect that a current is flowing between the anode and cathode.

Alternatively, the mainboard may also control the display screen component to play an animation showing that air bubbles are generated on the first position and the second position. Accordingly, the electronic device generates an effect that bubbles are generated from the anode and cathode.

The mainboard component may also control the display screen component to play an animation showing that electric current is respectively flowing from the first position and the second position to a battery icon on the screen. Accordingly, the electronic device generates an effect that a current is flowing from the anode and cathode to the battery icon.

Figure 8B:
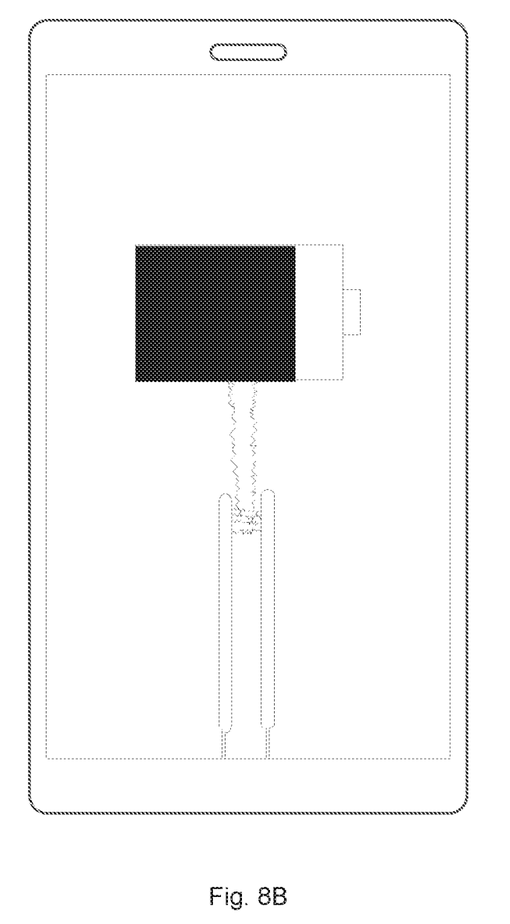
FIG. 8B is a schematic diagram showing a charging interface of an electronic device according to an exemplary embodiment.

FIG. 8B is a schematic diagram showing the charging interface of an electronic device according to an exemplary embodiment. When the electronic device is in a charging state, the mainboard component controls the display screen component to play an animation showing that electric current is flowing between positions corresponding to two electrode bars so as to indicate the process of charging the transparent electrolyte by the anode and the cathode. Wherein, the electric current flowing between the first position and the second position may also be implemented as bubbles whose size is in positive correlation relationship to current magnitude. Namely, the greater the current value is, the larger the bubbles are.

When the mainboard component controls the display screen component to display the icon of a battery on a display screen, it may also control the display screen to play an animation showing that electric current is respectively flowing from the first position and the second position to the battery icon.

In conclusion, as to the method for using an electronic device provided in embodiments of the present disclosure, a first position corresponding to the anode on the display screen component and a second position corresponding to the cathode on the display screen component are acquired by means of the mainboard component, and the display screen component is controlled to play an animation showing that electric current is flowing between the first position and the second position by means of the mainboard component during charging. Accordingly, the animation showing the electric current may be displayed at screen positions corresponding to electrode bars during charging due to transparency of the electronic device, thus solving the problem that ordinary electronic device are boring and dull during charging, and reaching the effect of improving user experience and increasing enjoyment.

Figure 9:
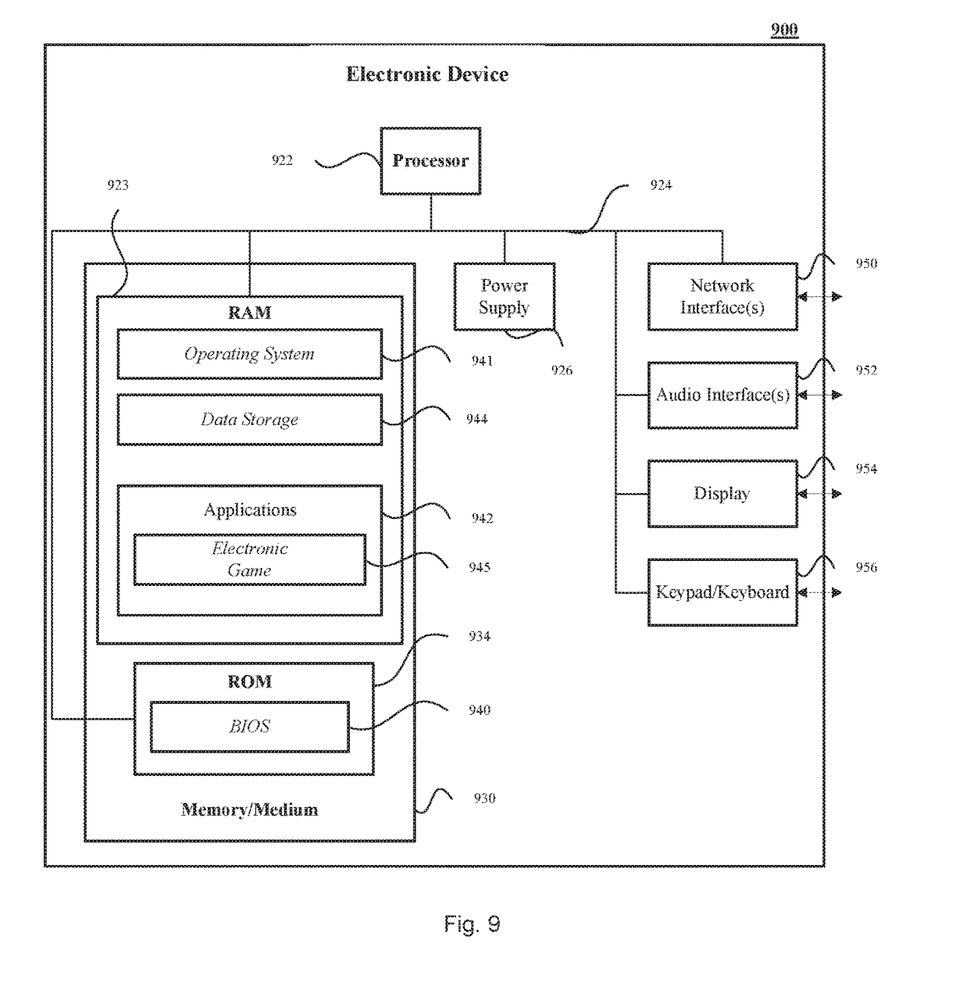
FIG. 9 is a schematic diagram illustrating an example embodiment 900 of an electronic device as introduced in the present disclosure.

FIG. 9 is a schematic diagram illustrating an example embodiment 900 of an electronic device as introduced in the present disclosure. The electronic device may include apparatuses to execute methods and software systems introduced in the present disclosure. The electronic device 900 may be a device, as shown in FIGS. 1-8B, capable of executing a software system. The electronic device 900 may, for example, also be a device such as a personal desktop computer or a portable device, such as a laptop computer, a tablet computer, a cellular telephone, or a smart phone.

The electronic device 900 may vary in terms of capabilities or features. Claimed subject matter is intended to cover a wide range of potential variations. For example, the electronic device 900 may include a keypad/keyboard 956. It may also include an audio interface 952, a network interface 950, and a display 954, such as a liquid crystal display (LCD), or a display with a high degree of functionality, such as a touch-sensitive color 2D or 3D display. In contrast, however, as another example, a web-enabled electronic device 900 may include one or more physical or virtual keyboards, and mass storage medium 930.

The electronic device 900 may also include or may execute a variety of operating systems 941, including an operating system, such as a Windows™ or Linux™, or a mobile operating system, such as iOS™, Android™, or Windows Mobile™. The electronic device 900 may include or may execute a variety of possible applications 942, such as an electronic game 945. An application 942 may enable communication with other devices via a network, such as communicating with another computer or server via a network.

Further, the electronic device 900 may include one or more non-transitory processor-readable storage media 930 and one or more processors 922 in communication with the non-transitory processor-readable storage media 930. For example, the non-transitory processor-readable storage media 930 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 930 may store sets of instructions, or units and/or modules that include the sets of instructions, for conducting operations and/or method steps described in the present disclosure. Alternatively, the units and/or modules may be hardware disposed in the electronic device 900 configured to conduct operations and/or method steps described in the present disclosure. The one or more processors may be configured to execute the sets of instructions and perform the methods and/or operations in example embodiments of the present disclosure.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes may be made without departing from the scope thereof. It is intended that the scope of the invention only be limited by the appended claims.

The invention claimed is:

1. An electronic device, comprising:
   a transparent case including a holding cavity accommodating a plurality of hardware components including:
   a mainboard component;
   a transparent display screen component electronically connected to the mainboard component;
   an accessory component electronically connected to the mainboard component; and
   a transparent liquid battery, wherein at least a portion of the liquid battery is substantially transparent;
   wherein the transparent case includes a transparent front cover and a transparent rear cover,
   the transparent front cover is connected to the transparent display screen component, and
   the holding cavity is formed by sealing a seam between the transparent front cover and the transparent rear cover;
   wherein the mainboard component includes:
   at least two transparent layers;
   a color changing layer sandwiched in the at least two transparent layers; and
   a control circuit configured to send a control signal to switch the color changing layer between at least two colors.

2. The electronic device of claim 1, wherein the transparent liquid battery includes transparent electrolyte, an anode, and a cathode;
   the transparent electrolyte occupying a target space within the holding cavity.

3. The electronic device of claim 2, wherein the target space includes a space of the holding cavity excluding a space occupied by the plurality of hardware components.

4. The electronic device of claim 2, wherein the plurality of hardware components further include a transparent container accommodating the anode and cathode,
   wherein the target space includes a space of the transparent container excluding the anode and the cathode.

5. The electronic device of claim 2, wherein the transparent electrolyte has a filling ratio of less than 1 in the target space.

6. The electronic device of claim 3, wherein the display screen component, the mainboard component, and the accessory component are externally sealed with a transparent material; and
   the transparent material is at least one of
   an acid-resistant material,
   an alkaline-resistant material,
   a material plated with the acid-resistant material, and
   a material plated with the alkaline-resistant material.

7. The electronic device of claim 2, wherein the mainboard component includes a circuit board and an electronic circuit thereon,
   the circuit board has a shape including a cartoon character or a shape customized by a user of the electronic device, and
   the electronic circuit includes a contour that matches the aesthetic shape.

8. The electronic device of claim 1, wherein the accessory component includes at least one lamp,
   each of the at least one lamp is configured to emit light with at least one color; and
   each of the at least one lamp is electronically connected to the mainboard component and the transparent liquid battery.

9. The electronic device of claim 1, wherein the accessory component includes at least one lamp positioned in the electronic device so that the light emitted generates a florescent glowing effect over the electronic device.

10. The electronic device of claim 8, wherein the accessory component further includes a color sensor electronically connected to the mainboard component and the transparent liquid battery.

11. The electronic device of claim 1, wherein the mainboard component is transparent.

12. The electronic device of claim 1, wherein
the control circuit is further configured to send a control signal to switch the color changing layer between at least two of a transparent state, a semi-transparent state, and an opaque state.

13. A method for operating an electronic device, wherein the electronic device comprises a mainboard component, a transparent display screen component electronically connected to the mainboard component, an accessory component electronically connected to the mainboard component, a transparent liquid battery, and a transparent case including a holding cavity accommodating the transparent liquid battery, the display screen component, the mainboard component, and the accessory component;
wherein the transparent case includes a transparent front cover and a transparent rear cover, the transparent front cover is connected to the transparent display screen component, and the holding cavity is formed by sealing a seam between the transparent front cover and the transparent rear cover; and
wherein the accessory component includes at least one lamp, each of the at least one lamp is configured to emit light with at least one color, and each of the at least one lamp is electronically connected to the mainboard component and the transparent liquid battery;
the method comprising;
controlling, by the mainboard component in the electronic device, the at least one lamp in the accessory component in the electronic device to emit the light to generate a florescent glowing effect over the electronic device;
detecting, by the mainboard component, a background color displayed by the transparent display screen component in the electronic device; and
controlling, by the mainboard component, the at least one lamp to emit the light corresponding to the background color.

14. The method of claim 13, further comprising:
detecting, by the mainboard component, a plurality of background colors displayed by the transparent display screen component in the electronic device; and
controlling, by the mainboard component, a plurality of lamps from the at least one lamp to emit the light at a predetermined order, wherein each lamp emits the light corresponding to a background color of the plurality of background colors.

15. The method of claim 13, further comprising:
receiving, by the mainboard component, a color instruction from a user; and
controlling, by the mainboard component, the at least one lamp to emit the light with a color corresponding to the color instruction.

16. The method of claim 13, further comprising:
acquiring, by the mainboard component, an identification of a target electronic device in communication with the electronic device;
determining, by the mainboard component, a preset color corresponding to the identification; and
controlling, by the mainboard component, the at least one lamp to emit the light corresponding to the preset color.

17. The method of claim 13, wherein the accessory component further comprises a color sensor electronically connected to the mainboard component and the transparent liquid battery, and
the method further comprises:
acquiring, by the color sensor in the accessory component, an environment color of the electronic device; and
controlling, by the mainboard component, the at least one lamp to emit the light corresponding to the environment color.

* * * * *